April 11, 1944.  J. M. WHITTENTON  2,346,529
PHOTOMETER
Filed March 14, 1942
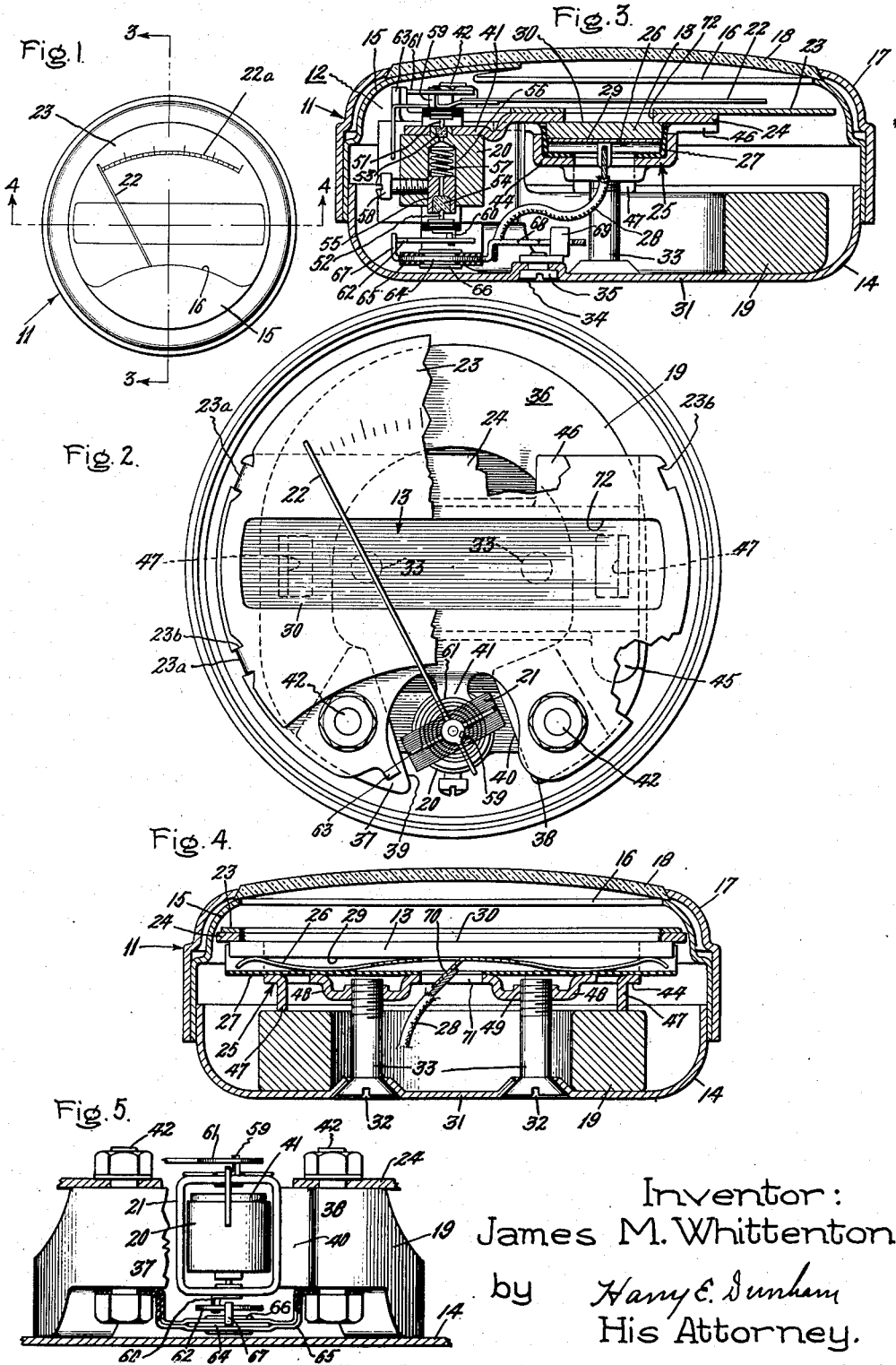
Inventor:
James M. Whittenton,
by Harry E. Dunham
His Attorney.

Patented Apr. 11, 1944

2,346,529

UNITED STATES PATENT OFFICE 2,346,529

PHOTOMETER

James M. Whittenton, Swampscott, Mass., assignor to General Electric Company, a corporation of New York Application March 14, 1942, Serial No. 434,713

2 Claims. (Cl. 88—23)

My invention relates to light meters and has for its principal object the provision of an improved, light weight, compact, sturdy, electrical instrument for measuring light intensity.

Other and further objects and advantages will become apparent as the description proceeds.

In carrying out my invention in its preferred form I provide a circular, relatively flat casing resembling a large pocket watch in size and shape and I provide a current responsive instrument within the casing having a horseshoe magnet conforming in shape to the interior surface of the casing and with the pole portion offset from the yoke portion of the horseshoe magnet in order to provide space for the photoelectric cell between the yoke portion of the magnet and an instrument scale plate which is mounted substantially in alinement with the front surface of the pole portion of the permanent magnet.

A better understanding of the invention will be afforded by the following detailed description considered in connection with the accompanying drawing and those features of the invention which are believed to be novel and patentable will be pointed out in the claims appended hereto.

In the drawing, Fig. 1 is a front elevation of a light meter forming an embodiment of my invention; Fig. 2 is an enlarged view of the apparatus of Fig. 1 with certain portions broken away in order to expose the interior of the mechanism in part; Fig. 3 is a view showing a section of the mechanism as cut by the plane 3—3 of Fig. 1; Fig. 4 is a view of the mechanism showing a section as cut by the plane 4—4 of Fig. 1, and Fig. 5 is a fragmentary view of the mechanism within the casing as seen from below. Like reference characters are utilized throughout the drawing to designate like parts.

For convenience in describing the mechanism and designating the relative location of parts in the description and claims, the apparatus is described as if it were positioned with the scale plate or face of the instrument in a vertical plane, as represented in Figs. 1 and 2. It should be understood, however, that my invention is not limited to maintaining the instrument in this position and words such as "front," "back," "upward" and "downward" in the description and claims are to be construed as designations of relative location and not absolute location.

The light meter shown in the drawing comprises a relatively flat or thin casing 11 within which are mounted a current-responsive instrument 12, such as a microammeter and a photocell 13, which is in turn mounted in the instrument 12. The casing 11 comprises a shallow dish-shaped back shell 14 having a flat back surface, a front shell 15 fitting over the back shell 14 and having an opening 16 for exposing an instrument scale plate, and a flanged bezel ring 17 fitting around and against the front shell 15. A slightly dished cover glass 18 is held in place over the front opening 16 by the bezel ring 17.

The instrument 12 comprises a permanent magnet 19, a core 20, a rotatable current-conducting coil 21 carrying an instrument pointer 22, a scale plate 23, carrying scale markings 22A cooperating with the pointer 22, a supporting frame 24 for the scale plate 23 and a cell holder 25.

The cell holder 25 and the frame 24 are united and serve also as supports for the magnet 19 and the core 20, and the core 20 serves to support the mountings for the coil 21, as will be more fully explained hereinafter.

There is a photocell assembly which comprises the actual photocell 13, a spring back 26, an insulator 27 of suitable sheet material and a pig-tail connection 28 between the spring back and one end of the coil 21. The photocell 13 may be of a conventional type except consisting of a non-magnetic plate, brass, for example, having a plain back surface 29 and a front surface 30 which has been coated with a suitable film consisting of coats of material such as selenium, cadmium and platinum, rendering the front surface 30 of the cell 13 responsive to light to form a photo voltaic cell of the type described in Patent No. 2,209,815, Goss et al., for example, except for substitution of the non-magnetic plate.

The back shell 14 of the casing 11 has a substantially plane-surface portion 31. Two countersunk openings 32 are provided in the back wall 31 to receive a pair of screws 33 for securely supporting the instrument in the casing with the major portion of the magnet 19 resting against the inner surface of the casing back shell 14. A counter-bored portion 34 is also provided in the back shell 14 for receiving a zero setter 35.

The greater portion of the magnet 19, which will be referred to as the yoke portion 36, is so shaped as to have a substantially planar back surface adapted to fit against the inner surface of the casing back shell 14 and a roughly circular outline in order to fit into the casing 11 with a high degree of space utilization. The magnet 19 has a pair of pole portions 37 and 38 which are below the yoke 36 and forwardly offset from the yoke portion 36 and from the plane surface of the back shell 14 of the casing 11. This serves to bring the coil receiving portion of the magnet in front of the yoke portion 36 in order that a straight pointer may be utilized for maximum utilization of space and the photocell 13 may be mounted between the scale plate 23 and the magnet yoke 36.

The pole portions 37 and 38 of the magnet 19 have pole faces 39 and 40 which are substantially parallel to each other but slanted away from the vertical in order to provide tapered air gaps between the pole faces 39 and 40 and the core 20, thus producing a substantially logarithmic instrument scale distribution and enabling the same instrument to be used for measuring a very wide range of light intensities with substantially the same percentage degree of accuracy.

For supporting the core 20 between the magnet pole faces 39 and 40 a downwardly extending, substantially flat tail portion 41 is provided in the supporting frame 24. The tail portion 41 of the frame is projection welded to the front surface of the core 20.

For supporting the frame 24 it is secured to the pole portions 37 and 38 by a pair of bolts 42. The scale plate 23 is secured to the frame 24 by suitable means, such as bent-over tabs 23A engaging flat notches 23B in the frame 24, and both the scale plate 23 and the frame 24 are composed of sheet material, preferably metallic, so that the two form an integral unit. The frame 24, at least, is composed of non-magnetic electrically-conducting material such as sheet brass, for example.

For further supporting the frame 24 and other parts of the instrument 12, the cell holder 25, which may be composed of stamped and formed sheet material, is projection welded to the back surface of the frame 24, as will be described hereinafter. The cell holder 25 comprises a backwardly extending channel portion 44 for receiving the cell 13, a pair of ears or tabs 45 at each end of the channel portion 44 and extending downwardly along the back surface of the frame 24 (only one ear 45 being shown in Fig. 2, partially exposed by breaking away a portion of the frame 24 and partially represented by hidden lines behind the frame 24). The cell holder 25 is also provided with a pair of flanges or ears 46 at each end of the channel portion 44 and extending upward along the back surface of the frame 24 (only one ear 46 being shown in Fig. 2, partially exposed and partially represented by hidden lines).

For securing the magnet 19, the cell holder 25 is provided with two formed tabs 47 extending down at either end of the channel portion 44 of the cell holder 25 and bearing against either side of the yoke portion 36 of the magnet 19. The ears 45 and 46 of the cell holder 25 are projection welded to the back surface of the frame 24 so that the cell holder 25 and the frame 24 form an integral unit for clamping the instrument in place in the casing 11. For securing this clamping unit to the casing 11, the cell holder 25 may have offset button portions 48 formed in the flange portion 44, each button portion 48 having a threaded opening 49 adapted to receive the end of one of the fastening screws 33. Thus the clamping unit consisting of the frame 24 and the cell holder 25 is secured to the back portion of the casing 11 by the screws 33 and serves to hold the magnet 19 in place by the pressure of the tabs 47 on the yoke portion 16 and the attachment of bolts 42 securing the lower end of the frame 24 to the yoke portions 37 and 38 of the magnet 19.

As previously explained the core 20 is supported by the tail portion 41 of the frame 24. The coil 21 is in turn rotatably supported by a mounting secured in the core 20. The coil 21 has secured thereto a pair of inwardly extending pivots 51 and 52 (Fig. 3) and cooperating therewith are cupped jewels 53 and 54 mounted in the core 20 at the ends of the central axis, whereby the coil 21 is provided with an axis of rotation substantially coaxial with the core 20, which may be substantially in the form of a right circular cylinder. To facilitate mounting the coil when the instrument is assembled the jewel 54 may be secured in a plug 55 adapted to fit slidably in the end of an opening 56 in the core 20 and a spring 57 may be interposed in the opening 56 between the seat of the opening and the plug 55, in order to permit the jewel 54 to be depressed sufficiently to allow adequate clearance for the coil pivot 52 during assembly. The set screw 58 may be provided in the core 20 for fixing the position of the plug 55 after the coil 21 has been mounted in place with its pivots 51 and 52 engaging the jewels 53 and 54.

The pointer 22 is secured to the front end of the coil 21 and a pair of lugs 59 and 60 extending frontwardly and backwardly from the coil 21 and parallel to the pivot axis of the coil are provided for making electrical connections to the coil and for securing the coil to biasing springs. One end of the wire forming the coil 21 is electrically connected to the lug 59 and the other end is electrically connected to the lug 60. Spiral springs 61 and 62 are provided at the front and back ends of the coil 21 to serve the dual function of bringing in electrical connections to the coil and providing spring bias to return the pointer 22 to the zero position of the scale when no light is falling on the cell 13. A connection tab 63 is formed in the frame 24. The outer end of the spring 61 is electrically and mechanically connected to the tab 63 while the inner end of the spiral spring 61 is electrically and mechanically connected to the coil terminal lug 59. The inner end of the spiral spring 62 is similarly connected mechanically and electrically to the coil terminal lug 60.

For supporting the outer end of the spiral spring 62 and for providing zero adjustment a zero adjusting fork member 64 is provided and a pair of insulating straps 65 are provided for holding the fork member 64. The ends of the straps 65 are secured under the back ends of the bolts 42 against the pole portions 37 and 38 of the magnet 19 and the central portions of the straps 65 are spread to receive the fork member 64. The fork member 64 is rotatably held between the straps 65 by a rivet 66 fitting openings in the central portion of the member 64 and the straps 65. A transversely bent lug 67 is formed in the member 64 to which the outer end of the spiral spring 62 is connected, and the member 64 has a radially projecting fork 68 cooperating with an eccentric pin 69 secured to the zero setter 35.

The spring back 26 of the photocell assembly is composed of a resilient electrically conducting sheet metal such as spring brass, for example, and is provided with a tab 70 to which the pig-tail connection 28 is electrically connected. An opening 71 is provided in the cell holder 25 to permit the pig-tail 28, which preferably consists of insulated wire, to extend to the fork member 64 of the coil mounting arrangement. The remaining end of the pig-tail 28 is electrically connected to the fork member 64 (Fig. 3). Since the front surface 30 of the cell 13 bears against the back surface of the frame 24 it makes electrical contact therewith and the cell 13 is electrically connected to the instrument coil 21. The electrical circuit may be traced from the front surface 30 of the cell 13 through the frame 24 through the connecting lug 63, the spiral spring 61, the coil terminal lug 59, the coil 21, the coil terminal lug 60, the spiral spring 62, the lug 67 of the zero adjustment fork member 64, the pig-tail 28, the tab 70, the spring back 26 and the back surface 29 of the cell 13.

Rectangular openings 72 slightly smaller than the front surface 30 of the cell 13 are provided in both the scale plate 23 and the frame 24 in order to expose the front surface 30 of the cell 13 to light admitted through the cover glass 18 of the instrument. Preferably the openings 72 in the scale plate 23 and the frame 24 register and are the same size. In this manner light falling upon the photoelectric cell 13 causes a photo-voltaic voltage to be set up therein depending upon the intensity of the light falling upon the surface of the cell and the voltage to be generated causes a current to flow in the coil 21 of the instrument which thereupon deflects its pointer 22 in accordance with the intensity of the light measured. It will be observed that the assembly is fully supported and that the light meter will operate without having the scale plate 23 in place. This permits checking the cell, the electrical instrument and the electrical connection before mounting the scale plate. It will be understood that for measuring intensity of illumination on a vertical surface the light meter shown in the drawing will be held with the surface 30 of the cell 13 vertical and for measuring the intensity of illumination on a horizontal surface the meter will be held with the surface 30 horizontal.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A light meter and casing therefor said casing conforming in size and shape to a watch casing having thin non-magnetic metallic back and edge walls and a front transparent cover portion, an electrical measurement instrument within said casing comprising a horseshoe permanent magnet having a lateral circular outline and lateral size conforming substantially to the lateral circular shape and lateral interior size of said casing, the back of the yoke portion of said magnet resting against the inner back wall of said casing and the pole piece portions of said magnet being offset relative to the yoke portion thereof towards the cover of said casing to provide a recess beneath the pole piece portion adjacent the back wall of the casing, an armature winding for said instrument rotatively mounted between the pole pieces of said magnet and having a spiral conductor lead and support therefor between the pole pieces and the back wall of said casing in said recess, a non-magnetic light-sensitive cell structure within said casing occupying space, in depth, between the yoke portion of said magnet and transparent cover and, laterally, between the magnetic pole pieces and the opposite side wall of said casing whereby the thickness of said casing is not required to be increased by reason of the presence of said light-sensitive cell structure, said cell being exposed to light entering said transparent cover and electrically connected in series with said moving coil armature, and a stationary scale and a moving pointer for said instrument exposed through the transparent cover of said casing, said light-sensitive cell extending diametrically substantially across the central portion of said casing between the magnet and scale and beneath the pointer.

2. A light meter comprising a casing conforming substantially to the size and shape of a large size pocket watch, a U-shaped permanent magnet in the bottom of said casing with its yoke portion resting against the inside back wall of said casing, the lateral dimensions of said magnet conforming substantially to the lateral inside dimensions of said casing in order to permit the use of a casing not greatly larger in diameter than the lateral dimensions of said magnet, the pole portions of said magnet being offset from the back wall toward the front of said casing to leave a recess beneath the pole pieces and between them and the back wall, a cylindrical core and a coil mounted between the pole pieces, a lower lead spiral for said coil contained within said recess and supported from the lower surfaces of said pole pieces, an integral light cell holder and frame of non-magnetic conducting material resting upon the yoke portion of said magnet and held to the back of the casing by screws passing through the yoke of the magnet and securely clamping said magnet to the back wall of the casing, said framework being rigidly secured to the upper surfaces of the pole portions of said magnet and to the upper end of said core, an upper lead spiral for said coil secured from the upper surfaces of said pole portions, internal pivot bearings for said coil supported in said core, a non-magnetic light cell connected to said coil and carried by said cell holder and framework above the yoke portion of the magnet and laterally between the offset pole portions thereof and the opposite side wall of said casing below the upper end of said coil, a non-magnetic scale plate having an opening opposite said cell supported by said framework and extending laterally of said casing substantially level with the upper end of the coil, a straight pointer secured to the upper end of said coil and extending horizontally over said scale plate, and a transparent top cover for said casing emitting light to said cell and making visible the indications of said pointer.

JAMES M. WHITTENTON.